Dec. 30, 1924.  
E. L. PFUNDER  
COLLET CHUCK  
Filed June 28, 1923
1,520,882
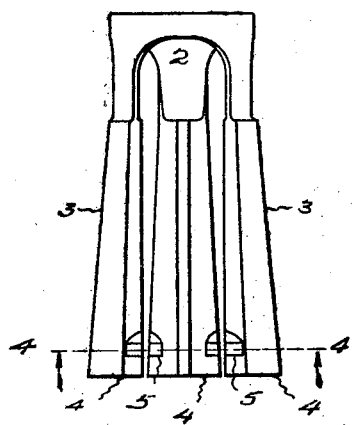
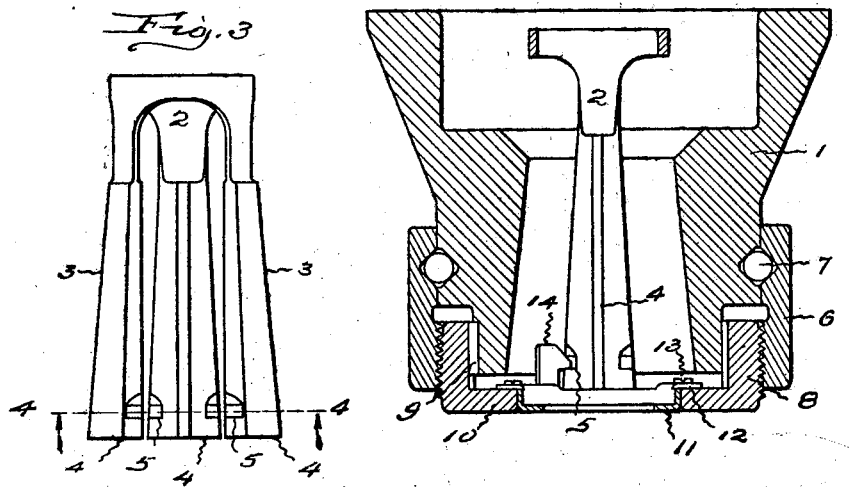
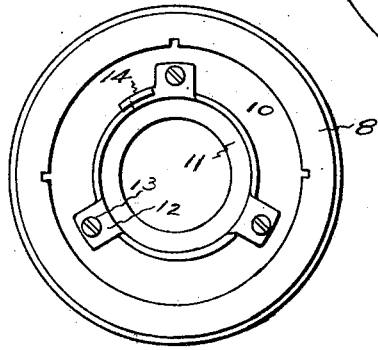
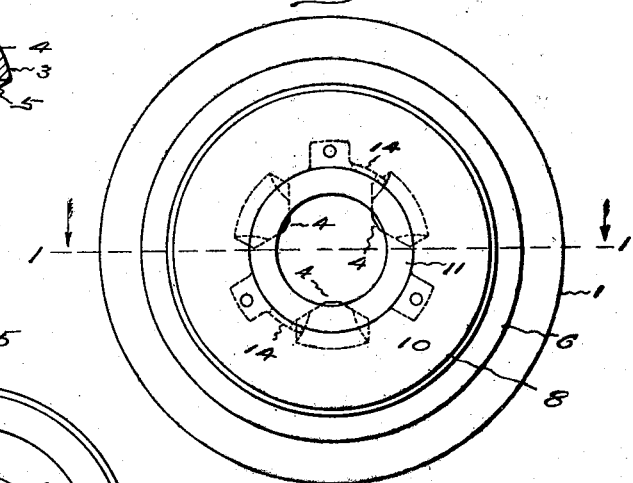
INVENTOR  
Ernst L. Pfunder  
by Harry P. Williams  
atty.

Patented Dec. 30, 1924.

1,520,882

UNITED STATES PATENT OFFICE.

EMIL L. PFUNDER, OF WINDSOR, CONNECTICUT, ASSIGNOR TO THE J. M. NEY COMPANY, OF HARTFORD, CONNECTICUT, A CORPORATION OF CONNECTICUT.

COLLET CHUCK.

Application filed June 28, 1923. Serial No. 648,180.

*To all whom it may concern:*

Be it known that I, EMIL L. PFUNDER, a citizen of the United States, residing at Windsor, in the county of Hartford and State of Connecticut, have invented a new and useful Improvement in Collet Chucks, of which the following is a specification.

This invention relates to chucks of the collet type, that is, chucks that are more especially designed for attachment to the arbors or spindles of lathes, milling machines, screw machines or the like heavy machine tool, although adaptable for use with drill presses and other light machine tools, which chucks have holding jaws that are connected with each other, usually being formed from a single piece of hardened spring metal, and which open and close but slightly, interchangeable collets of various capacities for stock of different sizes and character usually being provided for a single body. These chucks are employed for holding long rods or short pieces of stock, the diameter of which varies but little if any, and more particularly where quantity production is involved and accuracy is required, that is, where a large number of the same or similar pieces are to be produced to exact size. In such work time and convenience in operating the chuck are important factors in the cost of production.

The object of the present invention is to provide a simple means for releasing the grip of the collet of such a chuck, which grip is usually very tight, and thus reduce the time required for removing a finished piece from and inserting another piece of stock into the chuck, which releasing means also functions to exclude chips from the interior of the chuck, thus eliminating an annoyance as the collection of chips in the interior interfere with the accuracy with which the jaws hold the stock.

The invention is illustrated and described herein in connection with a chuck of the character set forth in United States Patent #1,398,341 granted November 29, 1921, it being particularly applicable to the chuck conceived by me and disclosed in said patent. Figure 1 of the accompanying drawings shows a central longitudinal section of such a chuck provided with the present improvement. Fig. 2 is a view looking toward the jaw end of the chuck. Fig. 3 shows a side view of the chuck collet. Fig. 4 is a transverse section of the collet on the plane indicated by the dotted line 4—4 on Fig. 3. Fig. 5 is a view looking into the collet controlling collar and showing the collet releasing means.

The body 1 of the chuck has a conical opening at one end in which is located the spring jaw collet 2. The backs 3 of the holding jaws 4 of the collet are tapering and they co-operate with the inclined wall of the opening in the body in the usual way, that is, when the collet is forced back into the body the jaws are caused to contract and when the collet is drawn forward the jaws are allowed to expand. Near the outer ends the sides of the jaws of the collet are provided with notches 5.

Rotatably fitted on the body is a sleeve 6. This sleeve is retained from longitudinal movement by balls 7 which may be introduced, as more fully described in the above mentioned patent, into grooves formed partly in the exterior wall of the body and partly in the interior wall of the sleeve. The outer end of the body is reduced in size and fitted to move longitudinally on this section is a collar 8. A key 9 is arranged between the parts to prevent the collar from rotating. On the exterior of the longitudinally movable collar is a thread that is engaged with a thread in the interior of the rotatable sleeve so that the rotation of the sleeve will cause the collar to be carried in and out, depending on the direction of rotation of the sleeve.

The outer end of the collar has an inwardly extending flange 10 and in the opening in this flange is an annular plate or ring 11. The annular plate shown on the inside has ears 12 which overlap the inside of the flange of the collar and through which screws 13 are turned into the flange for securing the plate in place in the opening. Extending inward from the annular plate are hooks 14. These hooks are so located that they will enter notches in the sides of the collet jaws and engage with the outer walls of the notches. The hooks, rotarily, face in opposite directions, that is, they are arranged on diametrically opposite sides in such manner that one hook will enter a notch on one side of one jaw and the other hook will enter a notch on the other side of another jaw. With this arrangement the collet is so engaged by the hooks that when the parts are assembled the collet cannot rotate and release itself from the hooks.

In assembling the elements the collet may be dropped into the conical opening in the body and then the collar with the annular plate and the hooks placed over the end of the collet and engaged with the sleeve so that the rotation of the sleeve will draw the collar into place. As the collar enters the sleeve the collet will automatically center itself and cause the hooks to engage the walls of the notches in the ends of the jaws so that any movement of the collar is transmitted to the collet.

When the sleeve is rotated in one direction the collar is drawn in and the flange engaging with the ends of the jaws forces the collet in and causes the jaws to contract. When the sleeve is rotated in the opposite direction the collar is carried out and the hooks engaging with the jaws positively draw the collet out and allow the jaws to expand. This eliminates the possibility of the collet hanging back in the body in a closed position and hindering the removal of a piece of stock. The diameter of the hole in the annular plate or ring which carries the hooks may vary, but it preferably is only slightly larger than the diameter of the stock to be held by the collet jaws so that the opening into the body will be substantially closed, ensuring the exclusion of chips and dirt when the chuck is in use.

The invention claimed is:

1. A collet chuck having a body with a conical opening, a spring collet located in said opening, the jaws of the collet having notches in their sides near the outer ends, a collar movable longitudinally on the body, said collar having an inwardly extending flange at its outer end adapted to engage and force the collet inward, an annular plate detachably secured to the inside of the flange of the collar, hooks bent inward from the annular plate and adapted to engage the outer walls of the notches in the collet jaws and draw the collet outward, a sleeve rotatably mounted on the body, and a threaded connection between the sleeve and collar whereby the rotation of the former will move the latter longitudinally.

2. A collet chuck having a body with a conical opening, a spring collet located in said opening, the jaws of the collet having notches in their sides near the outer ends, a collar movable longitudinally on the body and adapted to engage and force the collet inward, an annular plate detachably secured to the collar, hooks rotarily facing in opposite directions projecting from the annular plate into the notches in the collet jaws and adapted to draw the collet outward, a sleeve rotatably mounted on the body, and means connecting the sleeve and collar whereby the rotation of the former will move the latter longitudinally.

3. A collet chuck having a body with a conical opening, a spring collet located in said opening, the jaws of the collet having notches in their sides near the outer ends, a collar movable longitudinally on the body and adapted to engage and force the collet inward, a chip excluding member secured to the collar and having means extending into the notches in the collet jaws and adapted to draw the collet outward, a sleeve rotatably mounted on the body, and means connecting the sleeve and collar whereby the rotation of the former will move the latter longitudinally.

EMIL L. PFUNDER.